United States Patent Office 3,340,867
Patented Sept. 12, 1967

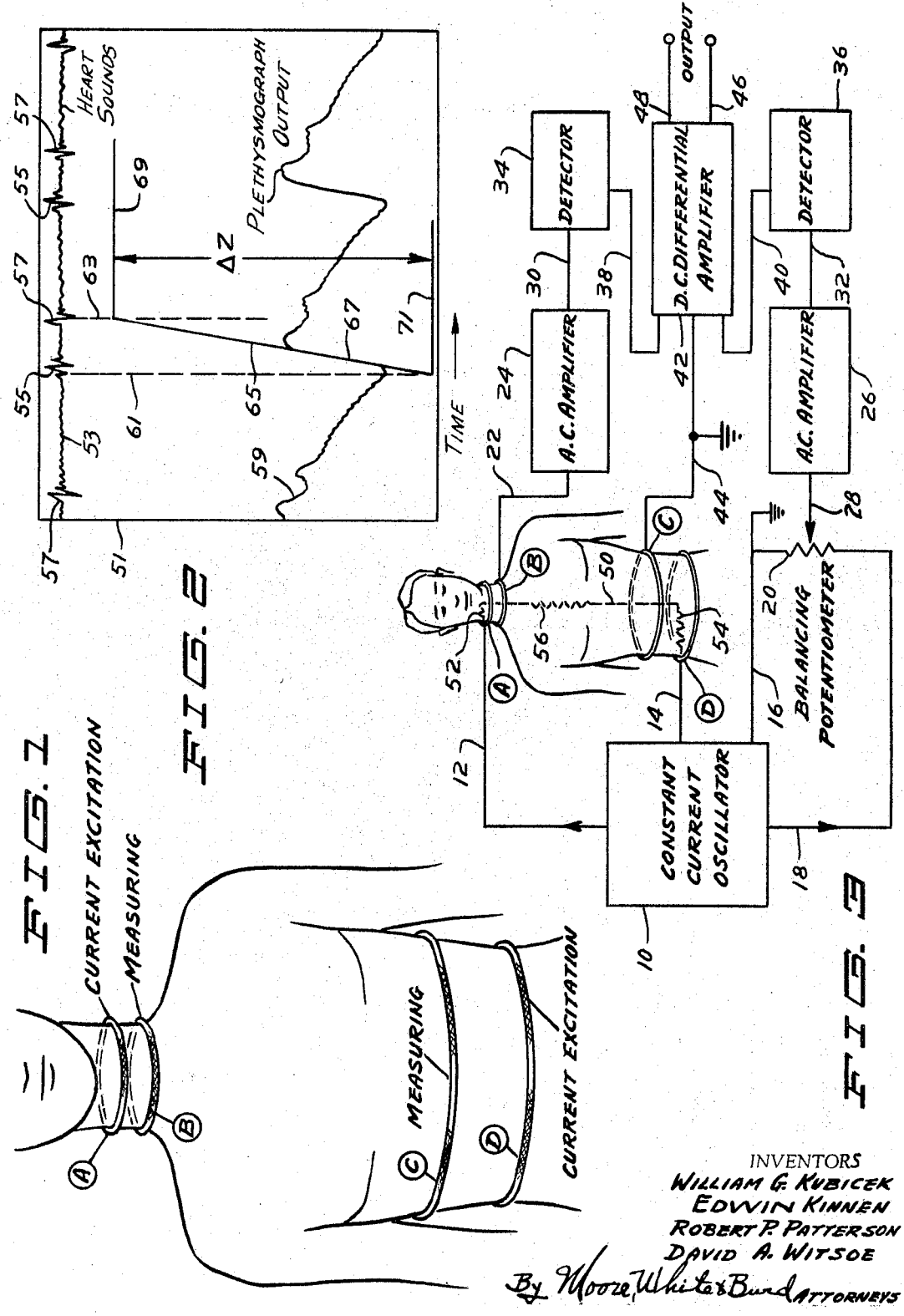

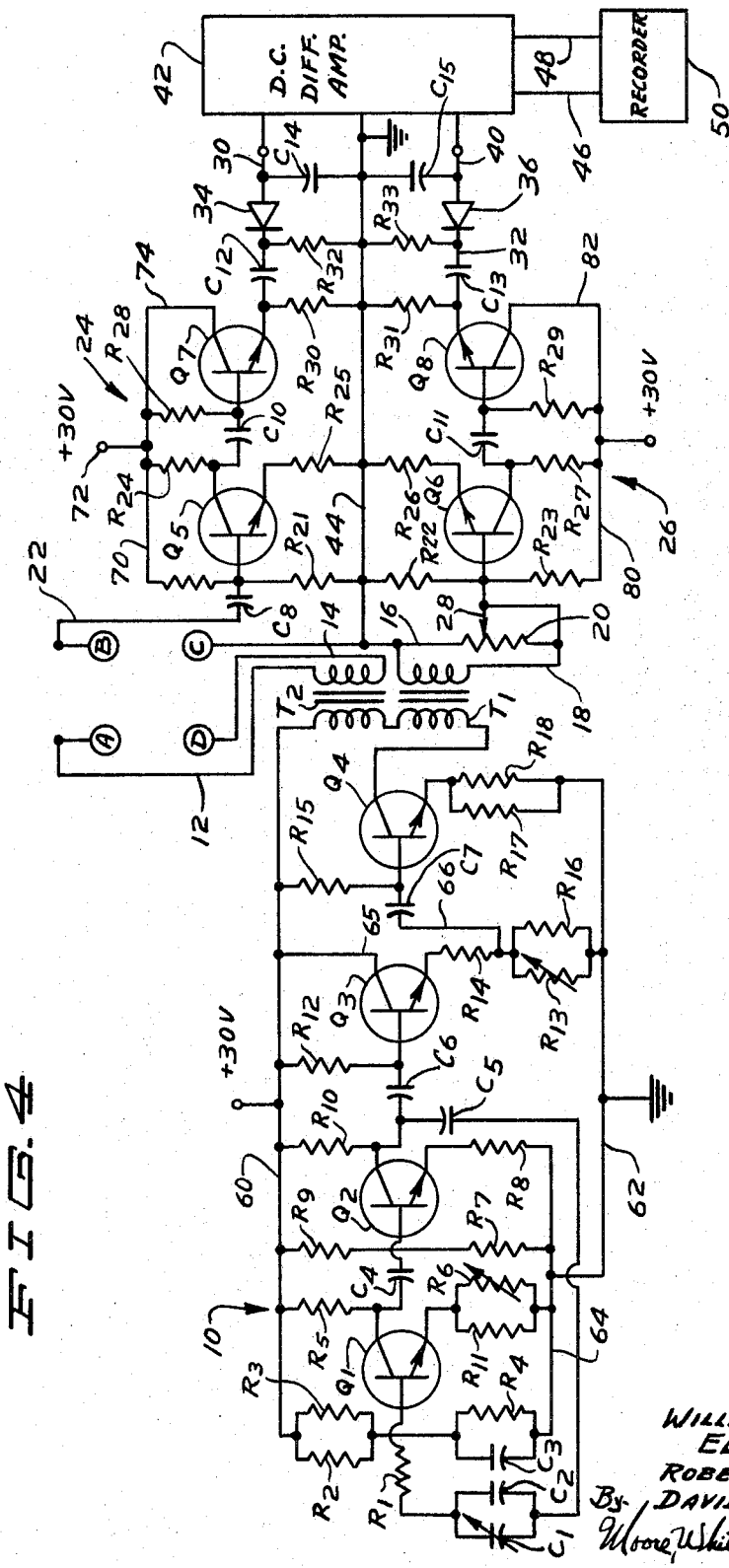

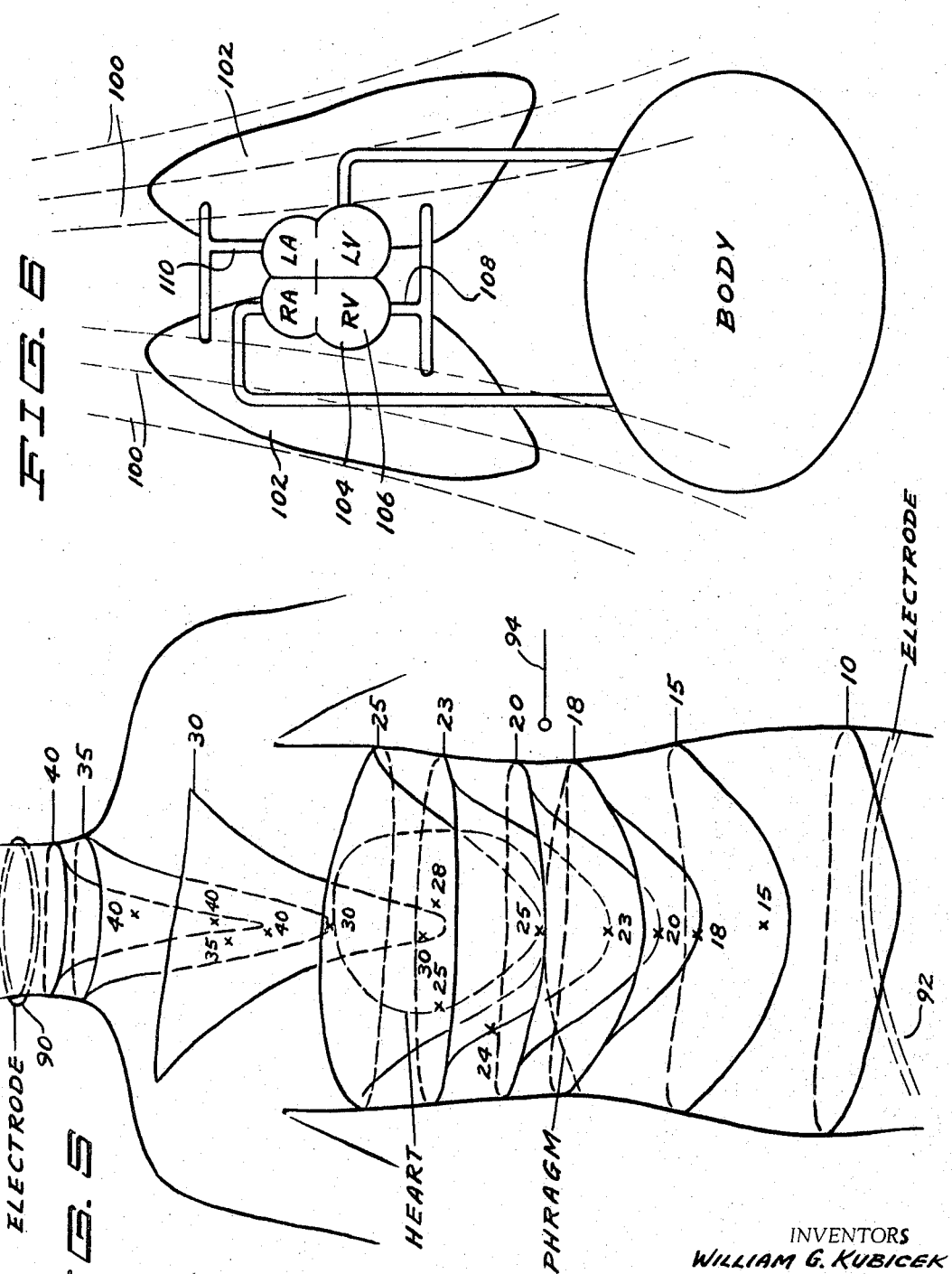

3,340,867
IMPEDANCE PLETHYSMOGRAPH
William G. Kubicek, Rosemount, Minn., Edwin Kinnen, Pittsford, N.Y., Robert P. Patterson, Minneapolis, Minn., and David A. Witsoe, Rochester, N.Y., assignors to the Regents of the University of Minnesota, Minneapolis, Minn., a corporation of Minnesota
Filed Aug. 19, 1964, Ser. No. 390,555
13 Claims. (Cl. 128—2.05)

The present invention relates to plethysmographs and particularly to an impedance plethysmograph and process of using the same. The invention is particularly useful in determining cardiac output.

In accordance with the present invention, a current flux is distributed in the mammalian thorax by the the placement of electrodes at the neck and lower thorax. According to one form of the invention the electrodes have the form of bands positioned to encircle the neck and thorax. To these electrodes is applied a fluctuating excitation current. The impedance of the thorax is then measured with either the same electrodes or with different electrodes to obtain information concerning cardiac activity and particularly cardiac output.

In evaluating the invention, measurements have been made which indicate that the major portion of excitation current flux passed through the lung tissues, rather than through the lower resistivity volume of the major thoracic arteries, veins and the heart. Accordingly, it is possible to measure the blood volume changes of the lungs and derive cardiac output from the impedance changes.

The evaluations were based upon measurements of current densities around different regions on the circumference of the electrodes, equipotential surfaces constructed from both surface and interior potential measurements, externally observed directed flux impedance waveforms and tests conducted with a model representing the thorax. The impedance plethysmographic waveforms obtained between the electrodes appeared to monitor the pulmonary flow as reflected by impedance changes in the pulmonary vascular bed.

The invention is based on the measurement of electrical impedance changes in the thorax during application of a fluctuating current (such as a 100 kc. current having RMS value of 5.0 ma.) between electrodes placed on the surface of the thorax. This procedure provides the advantage of minimum subject preparation and constraint.

A variety of electrodes have been investigated for potential use. Results obtained with four braided band electrodes, two positioned around the neck and two placed around the subject's midsection have been the most acceptable. The experimentally determined values of cardiac output obtained from these impedance measurements have been found to be significantly correlated to simultaneously performed studies using the Fick and dye dilution procedures as reported, for example, in Circulatory Physiology: Cardiac Output and Its Regulation, Arthur C. Greyton, W. B. Saunders Co., 1963, pages 21–71. The system according to the present invention has also been shown to be relatively insensitive to body type and lung air volume.

To verify the determination of cardiac output from impedance measurements, an understanding of the physiological phenomena responsible for the measured variations must be obtained. In particular the excitation current flux paths in the thorax between the excitation electrodes must be established.

It has been found that the only tenable theoretical flux distribution path is that in which the majority of he curren flux passes from the band electrodes into the lung volume and tends to avoid the heart blood volume regions. Consequently, this current flux distribution implies that the measured impedance is an indication of the total movement of blood in the pulmonary vascular bed.

The impedance waveforms obtained with two band electrodes, one positioned at the neck and the other about 2 cm. below the xiphisternal joint, appeared to reflect the pulmonary blood pulsations in the lungs rather than the direct ventricular volume change. The equipotential surfaces sketched from thorax potential measurements indicated a flow of current from the blood volume regions. The largest density of the current leaving a band electrode positioned at the midsection of the thorax was found at the base of the lungs on the posterior thorax.

Each of these results would indicate that in an electrode configuration including one band electrode about the neck and another about the thorax as set forth above, the majority of the current flux passed through the lungs, such that the major observed impedance characteristics were controlled by the pulsating pulmonary volume changes. Furthermore, the relatively accurate cardiac output determinations made by these impedance measurements were apparently based on an indirect indication of right ventricular stroke volume as reflected by the pulmonary vascular bed.

Among the objects of the invention is the provision of a method and apparatus for sensing and recording cardiac output.

Another object of the invention is the provision of a plethysmographic system for obtaining a record of cardiac output wherein a minimum of subject restraint is required and wherein no surgical procedure is necessary.

Another object of the invention is the provision of an improved plethysmographic process and apparatus suitable for use in routine physical testing to obtain a record from which cardiac output can be derived.

Another object of the invention is the provision of an improved plethysmographic process and apparatus including a reliable means for eliminating errors caused by skin impedance at the stimulating electrodes.

Yet another object of the invention is the provision of an improved process and apparatus for measuring and recording cardiac output wherein a single manual adjustment is required to set the electrically sensing and recording devices of the invention in condition for making a recording.

Yet another object of the invention is the provision of an improved means for sensing and recording impedance changes in an organ wherein the reactive component of the impedance of the organ will not prevent making reliable impedance readings.

Yet another object of the invention is the provision of an improved means for measuring cardiac output wherein a first set of electrodes are placed respectively at the upper and lower ends of the thorax to provide electrical stimulation and a second pair of measuring electrodes are attached to the thorax intermediate the excitation electrodes.

A still further object of the invention is the provision of an improved plethysmographic apparatus and process for measuring cardiac output including a means for generating a constant fluctuating current to excite the tissue, a means for applying the current thus generated to the thorax of an animal, a sensing means connected to the thorax for receiving a signal from which the impedance between two spaced apart points can be measured, a balancing means connected to the current generating means for matching the current produced by the current generating means with the signal thus sensed and a means for rectifying both the excitation signal and the sensed signal and for comparing the signal thus sensed with the excitation signal.

Other objects of the invention will become apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention is illustrated by the accompanying drawings in which the same numerals refer to corresponding parts and in which:

FIGURE 1 is a partial front elevational view of a human subject showing the position of the excitation and measuring electrodes when placed in position for use;

FIGURE 2 is a diagram representing a portion of a strip chart record prepared in accordance with the system of the present invention and including a record of audible heart sounds at the top thereof and at the bottom a record of the impedance changes in the thorax as measured by the use of the system of the invention;

FIGURE 3 is a schematic block diagram illustrating the means used for connecting the current excitation and recording electrodes in accordance with the system of the invention;

FIGURE 4 is a schematic circuit diagram of the current excitation oscillator and recording means of the system of the invention;

FIGURE 5 is a partial diagrammatic view of a mammalian body illustrating typical equipotential surfaces as determined in the evaluation of the system of the invention; and FIGURE 6 is a diagram illustrating the position and direction of current flux lines between the stimulating electrodes of the system of the invention.

Referring now to the figures of the drawings which illustrate by way of example a preferred form of practicing the invention, there is shown in FIGURES 1 and 3 a pair of current excitational electrodes A and D each desirably formed from a braided copper wire. The electrodes A and D are positioned, respectively, at the upper portion of the neck and around the lower abdomen. Positioned intermediate the electrodes A and D is a pair of measuring electrodes B and C, the electrode B being positioned at the base of the neck and the electrode C approximately 2 cm. below the xiphisternal joint with the skin of the thorax. The electrodes B and C are also desirably constructed of braided copper wire.

As shown in FIGURE 3, there is provided a constant current oscillator 10, the construction of which will be described more fully hereinbelow, and including an output lead 12 which is connected to the electrode A and an output lead 14 connected to the electrode D. The oscillator 10 is of the type adapted to produce a constant fluctuating current, such as a 100 kc. alternating current. The oscillator 10 passes the same current applied through the conductors 12 and 14 through a set of conductors 16 and 18 which are connected to the ends of the balancing potentiometer 20.

Connected to the electrode B by means of a conductor 22 is an alternating current amplifier 24 which will be described more fully hereinbelow. A similar amplifier 26 is connected to the slide arm 28 of the potentiometer 20.

The outputs of the amplifiers 24 and 26 are fed through conductors 30 and 32, respectively, to rectifying means, such as detectors 34 and 36, to a subtraction or comparing means such as a DC differential amplifier 42. A conductor 44 is connected between the electrode C and the differential amplifier 42. The output signal produced by the differential amplifier 42 is fed through a pair of conductors 46 and 48 to a suitable measuring and recording instrument such as a strip chart recorder 50, as seen in FIGURE 4.

The skin impedance is eliminated by introducing into the thorax a current with the two outer electrodes using the constant current source 10 and then measuring a voltage between the inner electrodes that is proportional to the electrical impedance. Since the current is constant, the voltage equals a constant times the impedance. If the electrical input impedance of the instrument that measures the voltage between the inner electrodes is very high compared with the impedance between the inner electrodes, very little current will flow to the electrodes and, therefore, very little skin impedance will be measured.

In FIGURE 2 there will be seen a strip of recording paper 51 upon which heart sounds are recorded as a trace 53. Trace 53 includes a plurality of peaks 55 and 57 which indicate, respectively, the opening of the heart valve during systole and the closing of the heart valve at the end of systole. At the lower portion of the graph is recorded a trace 59 representing impedance measurements obtained from the differential amplifier 42. From the peaks 55 and 57 are constructed vertical lines 61 and 63. A third line 65 is constructed by drawing a straight line tangent to the maximum decreasing impedance slope at 67 during systole and extending this line to the first and second heart sounds or, in the alternative, to any other means indicating the beginning and end of systole. Where the extended line 65 intersects the lines 61 and 63, horizontal lines 69 and 71 are constructed. The distance between lines 71 and 69 is measured to find $\Delta Z$. Flow during each stroke of the heart continues between the opening of the heart valve as shown by the peak 55 and the closing of the valve at the end of systole as shown by the peak 57. The flow rate is a function of the rate of change of the impedance as shown by the slope at 67. Thus, by constructing line 65 between the opening and closing of the valves during systole a determination can be made of the theoretical change in impedance ($\Delta Z$) which takes into account all of the blood injected during that stroke into the thorax. The impedance change $\Delta x$ (across the electrodes B and C) can be determined from the distance between lines 69 and 71 by producing a known impedance change and measuring the height of the deflection peak caused by this change in the trace 59.

Referring now to FIGURE 4, and particularly to the constant current oscillator 10, it will be seen that current is provided from a 30 volt power supply (not shown) across lines 60 and 62. Connected to line 62 is a line 64 which is coupled to the emitter of a transistor Q1 through a variable resistance R6 in parallel with a fixed resistance R11. Line 62 is also connected through the line 64 to a fixed resistance R4 in parallel with a capacitance C3. Connected to line 60 in series with the resistance R4 and capacitance C3 are two parallel connected resistances R2 and R3. The base of Q1 is connected through a resistance R1 in series with parallel connected capacitances C1 and C2 and a capacitance C5 to the collector of a transistor Q2. The collector of Q1 is connected through a resistance R5 to line 60 and through a capacitance C4 to the base of Q2. Line 64 is also connected to line 60 through series connected resistances R7 and R9.

The emitter of Q2 is connected to line 64 through a resistance R8 while the collector thereof is connected to line 60 through a resistance R10 and to the base of a transistor Q3 through a capacitance C6. The base of Q3 is also connected to line 60 through resistance R12 while the emitter thereof is connected to line 62 through parallel connected resistances R13 and R16 in series with resistance R14. The collector of transistor Q3 is connected directly to line 60 by means of a conductor 65. The output of the transistor Q3 is fed through a line 66 connected between R13 and R16 and R14 and through capacitance C7 to the base of a transistor Q4, said base also being connected to line 60 through a resistance R15. The emitter of Q4 is wired through parallel connected resistances R17 and R18 with the line 62. The collector of Q4 is connected to the series coupled primary coils of transformers T1 and T2, the free terminal of the primary of T2 being connected to line 60.

The secondary of the transformer T2 is connected by means of the conductors 12 and 14 to the electrodes A and D, while the secondary of the transformer T1 is connected by means of the conductors 16 and 18 to the balancing potentiometer 20. In this manner, an oscillating output signal is fed in phase and in equal strength to both the excitation electrodes A and D and to the DC amplier 26 through the potentiometer 20.

The amplifier 24 includes a pair of transistors Q5 and Q7. The base of Q5 is connected to the electrode B through a capacitance C8. The collector of Q5 is connected to the base of Q7 through a capacitance C10. Connected between C10 and Q5 and a power supply line 70 is a resistance R24. Between the base of Q7, C10 and the line 70 is a resistance R28. Line 70 is connected to a suitable source of current, such as a 30 volt power supply, by means of a terminal 72. Line 70 is connected directly to the collector of Q7 through a line 74. The base and emitter of Q5 are connected to ground through resistances R21 and R25 respectively. The emitter of Q7 is connected to ground through a resistance R30 and to the diode 34 through a capacitance C12. One side of diode 34 is connected to ground through a resistance R32 and the other side is connected to ground through a capacitance C14.

The amplifier 26 includes a pair of transistors Q6 and Q8. Power is supplied through a line 80 to the base of Q6 through a resistance R23 and to the collector thereof through a resistance R27. Line 80 is also connected to the base of Q8 through a resistance R29 and directly to the collector through a conductor 82. The emitters of Q6 and Q8 are grounded through resistances R26 and R31, respectively. The base of Q6 is connected to ground through a resistance R22 and to the slide arm of the potentiometer 20. Between the collector of Q6 and the base of Q8 is a capacitance C11. The emitter of Q8 is connected through a capacitance C13 with the diode 36. The diode 36 is also connected to ground through a resistance R33 and the other side thereof is connected to ground through capacitance C15. In this manner, the output of the amplifiers 24 and 26 is rectified by the detectors 34 and 36 and the signals are subtracted by means of the differential amplifier 42. Any difference in the signals is either observed on the meter (not shown) connected to the lines 46 and 48 at the output of the differential amplifier 42 or recorded by means of recorder 50. It should also be seen that through the use of the present invention the capacitance component of the impedance will not interfere with accurate readings since phase differences are eliminated by rectifying the signals before they are compared and the difference recorded.

By way of example, the following circuit constants can be employed. The resistors have a ½ watt rating unless otherwise specified.

| | |
|---|---|
| Q1, 2, 3 | T1495. |
| Q4 | T1487. |
| Q5, 6 | 2N930. |
| Q7, 8 | 2N336. |
| 34, 36 | 1N625. |
| C6 | .05 mfd. |
| C7 | .5 mfd. |
| C8, 9 | 100 mfd. |
| C10, 11 | 220 mfd. |
| R1, 4, 14 | 2.2KΩ. |
| R2 | 82KΩ. |
| C1 | 45–25 mfd. |
| C2 | 300 mfd. |
| C3 | 270 mfd. |
| C4, 12, 13 | .001 mfd. |
| C5, 14, 15 | .01 mfd. |
| R3, 5 | 10KΩ. |
| R7 | 47KΩ. |
| R8 | 1KΩ. |
| R9, 28, 29 | 330KΩ. |
| R10, 11 | 6.8KΩ. |
| R12 | 1MΩ. |
| R15 | 39KΩ. |
| R16, 25, 26, 30, 31 | 4.7KΩ. |
| R17 | 100Ω, 1 watt. |
| R18 | 47Ω, 1 watt. |
| R20, 23 | 3.9MΩ. |
| R21, 22 | 680KΩ. |
| R24, 27, 32, 33 | 27KΩ. |
| R6 | 1MΩ trimpot. |
| R13 | 20KΩ trimpot. |
| 20 | 100Ω trimpot. |
| T1 and 2 | 5:1 turns ratio. |

In operation, the balancing potentiometer 20 is adjusted until there is an approximate zero steady state voltage at the output of the DC differential amplifier. Since an equal amount of current is passed through the thorax and through the balancing potentiometer 20, the voltage across each of them is proportional to the impedance of each. Therefore, when the plethysmograph is balanced, the resistance of the balancing potentiometer will equal the impedance magnitude between the inner electrodes. Since the balancing signal is obtained from the excitation signal, any variations in the excitation signal are balanced out, thereby eliminating artifacts caused by variations in the excitation signal. The small changing voltage from the DC differential amplifier which is caused by the change of impedance between the two inner electrodes is then fed to a graphic recorder. While the record is made the subject is instructed to hold his breath.

Refer now to FIGURE 5 which illustrates the equipotential planes constructed in evaluating the use of the invention. To compile this data, a pair of excitation electrodes 90 and 92 were placed around the neck and lower torso, respectively. A third electrode 94 was used as a movable probe to record potential at any location on the surface of the body or within the body. To this end, the electrode 94 was in some instances swallowed or inserted into other body cavities such as bronchi. A 100 kc. electrical excitation current of about 5 ma. was applied to the electrodes 90 and 92.

The electrodes 90 and 92 were connected in place of electrodes A and D of FIGURES 1, 3 and 4 and the electrode 94 was connected to the conductor 44. The band electrodes 90 and 92 of FIGURE 5 were made from tinned copper braid shielding. The braid was stretched to a width of about 1 cm. and coated on the inner side with electrode paste to provide a low impedance skin contact. The electrodes were applied approximately 5 min. before data were taken to allow the skin and paste to reach an equilibrium condition. For the two band electrode placement shown in FIGURE 5, and the 100 kc. excitation frequency used throughout this investigation, the thorax presented an average impedance of 37 ohms with a phase angle of 15°.

Several probe configurations were used in conjunction with the impedance plethysmograph to measure potential points on the surface and at various internal points of the thorax of human subjects and dogs. The external thorax surface probe was a ¾ in. circular brass disc. The probe used for potential measurements in the human esophagus was machined from stainless steel and attached to a nasogastric tube. A probe similar to the human esophagus probe but of larger dimension was used for measuring potentials in the trachea and large bronchi of dogs. To obtain measurements in the lower esophagus, an electrode was constructed with the metal contact from the lung probe mounted at the end of a ¼ inch rigid Plexiglas tube. A 0.003 inch stainless steel wire inserted in a saline irrigated catheter was used to determine potentials in the aorta, heart, and carotid artery. The esophagus electrode was swallowed by the subject and positioned by X-ray. The other electrodes were inserted orally or surgically into dogs anesthetized with sodium pentobarbitol, and positioned by X-ray and catheter length measurements.

The waveforms obtained while attempting to direct the current flux through particular portions of the thorax by placing electrodes A and D in selected locations showed there was a dominant characteristic of decreasing impedance during systole. The impedance decrease during systole exhibited by the waveform of the two excitation band electrode configuration of FIGURES 1 and 3 suggested that the dominant characteristic being observed is the movement of low resistivity blood into the thoracic regions carrying the majority of the current flux, as described in connection with FIGURE 6. The two possible regions in which this can occur are the pulmonary vascular bed, and the heart and arterial system. As the voltage drop between the neck electrode and position 1 was due to a constant current source, the effect of blood pulsations in the arteries above the rib cage appeared to produce minor contributions, if any, to the observed two band waveform.

Although current flux densities cannot be readily determined from equipotential surfaces, the direction of current flow can be established from a knowledge of these surfaces. With the direction of current flow normal to the equipotential surfaces, it is seen from FIGURE 5 that the current flux for the two band electrode configuration appeared to be moving out from the center of the thorax volume. It should be noted that the equipotential planes of FIGURE 5 suggest movement of flux away from the central regions.

The smallest electrode current density measured with the segmented electrode was found for the segment located nearest the heart apex. If the aorta and superior vena cava carried the majority of the current flux in the upper thorax, the flux would be expected to continue into the lower resistivity blood volume of the heart. The contrary observation indicated that relatively little current flux passed through the heart for the two band electrode configuration of FIGURE 5.

In preparing the diagram illustrating the equipotentials, the following potential surfaces were designated: 40 mv., 35 mv., 30 mv., 25 mv., 24 mv., 20 mv., 18 mv., 15 mv. and 10 mv., as can be seen in FIGURE 5. These surfaces extend downwardly at their center to a greater extent at the upper part of the thorax than at the lower part of the thorax. The numerical values are proportional to impedance values because the current is constant.

These studies indicate the position of flux lines at 100 as seen in FIGURE 6 and pass almost entirely through the lung tissue 102 rather than through the heart, which is indicated diagrammatically at 104. As can also be seen in FIGURE 6, the blood leaving the right ventricle 106 through the pulmonary artery 108 passes through the lungs to the left atrium through the pulmonary vein 110. It is thus concluded that the changes in impedance of the lungs are determined by the changes of the voltage between the electrodes B and C as a function of the stroke volume.

Cardiac output is calculated by multiplying the stroke volume, ΔV by the pulse rate. ΔV is calculated as follows:

$$\Delta V = P \times \frac{L^2}{Z^2} \times \Delta Z$$

P = the resistivity of blood
L = the distance in centimeters between the stimulating electrodes A and D
Z = the base or static impedance between the electrodes C and B
ΔZ = measured change in impedance between the electrodes as calculated in the manner described in connection with FIGURE 2.

In normal subjects this is the right cardiac output and in patients with congenital heart defects the cardiac output value will include blood flow shunted from the left heart to the pulmonary circulation.

The invention will be best understood by reference to the following examples. In calculating the cardiac output in the Examples 1 through 4, L was 27 centimeters, Z was 31.9 ohms and P was 150 ohms/cm.

TABLE I

| | Example 1 | Example 2 | Example 3 |
|---|---|---|---|
| ΔZ | .85Ω | .92Ω | .90Ω |
| ΔV | 91.4 cc | 99 cc | 96.8 cc |
| Pulse rate | 76 beats/min | 75.5 beats/min | 74 beats/min |
| C.O. | 6.98 liters/min | 7.48 liters/min | 7.15 liters/min |

Additional examples are given below in Table II, each example being taken from a different human subject using the braided copper-electrodes as described hereinabove and with a conductive material such as electrode paste to provide a low impedance electrical connection to the skin and to allow some movement between the skin and the electrodes. The electrodes were allowed to stand for a period of about five minutes in order that equilibrium is attained. Each human subject represented in Table II was a hospital patient having a heart defect. In some cases the tests were run after the defect had been repaired. A comparison is made in Table II between the cardiac output as determined by the system of the present invention and that obtained with the well known Fick pulmonary flow measurement on the same subject.

TABLE II.—CARDIAC OUTPUT-FICK COMPARISON

| Example No. | Fick | | Impedance C.O., l./min. | Percent Difference between Fick pulmonary flow and impedance C.O. |
|---|---|---|---|---|
| | Systemic Flow, l./min. | Pulmonary, l./min. | | |
| 4 | 6.3 | 7.86 | 5.21 | −31.3 |
| 5 | 2.5 | 4.8 | 5.5 | +14.6 |
| 6 | 5.0 | 5.2 | 5.22 | 0 |
| 7 | 3.6 | 5.0 | 4.43 | −11.4 |
| 8 | 3.1 | 5.9 | 6.29 | +6.6 |
| 9 | 4.65 | 5.0 | 4.81 | −3.8 |
| 10 | 4.0 | 4.0 | 4.13 | +3.2 |
| 11 | 6.0 | 6.0 | 6.66 | +11.0 |
| 12 | 4.7 | 4.7 | 4.24 | −9.6 |
| 13 | 5.4 | 5.4 | 6.22 | +15.2 |
| 14 | 5.9 | 5.9 | 6.2 | +5.1 |
| 15 | 5.9 | 5.9 | 6.34 | +7.4 |
| 16 | 6.1 | 6.1 | 6.62 | +8.5 |
| 17 | 6.8 | 6.8 | 6.71 | −1.3 |
| 18 | | 5.3 | 5.42 | −6.5 |
| 19 | 2.7 | 2.7 | 2.9 | +7.4 |
| 20 | 7.3 | 7.3 | 7.1 | −2.7 |
| 21 | 5.65 | 5.65 | 6.19 | +9.5 |
| 22 | 4.85 | 4.75 | 4.15 | −12.6 |
| 23 | | 4.3 | 4.87 | +13.2 |
| 24 | 7.7 | 7.7 | 8.08 | +4.9 |
| 25 | 7.2 | 7.2 | 7.19 | −1.4 |
| 26 | 4.0 | 4.9 | 5.09 | +3.9 |
| 27 | 5.3 | 5.3 | 5.9 | +11.3 |
| | | | | [1] ±8 |

[1] Average difference.

For convenience, the invention has been described with reference to electrodes of particular configuration, number and location, excitation current of particular value, and the like. It will be readily understood, however, that wide variations are possible without materially altering the usefulness of the data obtained. For example, while band electrodes encircling the neck and lower thorax are described, the electrodes need not be in the form of bands, nor is it necessary that the body portions be encircled. The precise location and separation of the electrodes is not critical. The excitation electrodes must be positioned above and below the measuring electrodes. The upper excitation electrode is to be positioned at or above the upper border of the lungs and the lower excitation electrode is to be positioned at or below the lower border of the heart and lungs. Within these limits numerous variations are possible.

While the use of a 100 kc. excitation current has been described, it will be apparent that the plethysmograph system is not so limited. However, the desireability of using a standardized excitation current source so that the data obtained at different times and places, etc., can be compared and correlated will be readily appreciated.

It is apparent that many modifications and variations of this invention as hereinbefore set forth may be made without departing from the spirit and scope thereof. The specific embodiments described are given by way of example only and the invention is limited only by the terms of the appended claims.

We claim:

1. A plethysmograph for measuring cardiac output comprising in combination excitation electrode means adapted to be connected to a mammalian subject at the superior and inferior ends of the thorax, a current generator means comprising an electronic oscillator conductively connected to the electrode means for supplying a fluctuating excitation current thereto, sensor means adapted to be conductively connected to said thorax for carrying a sensed electrical signal which varies as the impedance changes in the thorax between said electrode means, a control means conductively connected to the oscillator for balancing the current from the oscillator with the sensed signal, a first amplifier conductively connected to the control means, a second amplifier connected to said sensor means whereby signals of approximately equal strength are fed to said first and second amplifiers from said control and said sensor means respectively and a voltage subtracting means conductively connected to each of the amplifiers for comparing the output of each said amplifier.

2. The apparatus of claim 1 wherein a first rectifying means is conductively connected between the sensor means and the subtracting means and a second rectifying means is connected between the oscillator and the subtracting means.

3. A plethysmograph for measuring cardiac output comprising in combination a first elongated band excitation electrode adapted to be positioned to at least partially encircle the neck of a subject, a second elongated band excitation electrode adapted to be positioned to at least partially encircle the thorax of said subject at the approximate position of the xiphisternal joint, a source of a fluctuating current conductively connected across the electrodes for supplying an excitation current thereto, sensor means adapted to be conductively connected to said thorax for receiving a sensed signal, a voltage balancing means conductively connected to the oscillator, a first output lead conductively connected to the balancing means, a second output lead connected to said sensor means, and a voltage subtracting means conductively connected to each of the output leads for comparing the voltage, whereby the adjustment of the balancing means is adapted to feed signals of approximately equal strength to the subtracting means.

4. The apparatus according to claim 3 wherein said sensor means comprises a pair of measuring electrodes adapted to be positioned upon said thorax.

5. The apparatus according to claim 3 wherein said balancing means comprises a potentiometer wired to the output of said source of fluctuating current.

6. A plethylsmograph for measuring cardiac output comprising in combination a first elongated band excitation electrode adapted to be positioned around the neck of said subject, a second elongated band excitation electrode adapted to be positioned to encircle the thorax of said subject at the approximate location of the xiphisternal joint, an electronic oscillator means conductively connected across the excitation electrodes for supplying an excitation current thereto, sensor electrodes adapted to be conductively connected to said thorax for carrying a sensed current, a balancing means conductively connected to the oscillator, a first amplifier conductively connected to the balancing means, a second amplifier connected to one of said sensor electrodes, a voltage subtracting means conductively connected to each of the amplifiers for comparing the output thereof and a means for rectifying the current received by the subtracting means from each said amplifier means, whereby the adjustment of the balancing means is alapted to feed signals of approximately equal strength to said subtracting means.

7. A plethysmographic method for measuring cardiac output which comprises connecting excitation electrode means at the upper and lower ends of the thorax of a mammalian subject above the upper border of the lungs and below the lower border of the heart and lungs, respectively; connecting measuring electrode means to the thorax of the subject between said excitation electrode means; applying a constant fluctuating excitation current to said excitation electrode means and through a balancing resistance; amplifying, detecting and measuring the voltage across the measuring electrode means and across the balancing resistance and adjusting the balancing resistance to equalize the voltages; measuring the changes in impedance within the thorax as sensed by said measuring electrode means; and simultaneously measuring the beginning and end of systole of the subject and determining cardiac output therefrom.

8. A method according to claim 7 further characterized in that said measured change in impedance and simultaneously measured beginning and end of systole are recorded to produce a single composite graphic image, a straight line is constructed tangential to the portion of the graphic image at the maximum decreasing impedance slope during systole, said line extending to intersect parallel lines denoting beginning and end of systole, measuring the height of the line thus constructed and determining cardiac output therefrom.

9. The method according to claim 7 wherein said excitation electrode means comprises a pair of encircling electrodes, one adapted to at least partially encircle the neck and the other adapted to at least partially encircle the thorax of the subject at the xiphisternal joint and wherein said measuring electrode means comprises a pair of electrodes adapted to be positioned between and a short distance inwardly from each of said pair of excitation electrodes.

10. A plethysmograph comprising in combination: excitation electrode means adapted to be connected to a mammalian subject at the superior and inferior ends of the thorax; electric generator means for supplying a fluctuating excitation current, said generator means being conductively connected to said electrode means whereby said excitation current is applied to said electrode means; measuring means; conductor means adapted to be conductively connected to the thorax and to said measuring means for carrying an electrical signal from the portion of the thorax between said electrode means to said measuring means; balancing means connected to said generator means for providing a second electrical signal approximately equal in magnitude to said first mentioned signal; means for rectifying each of said signals; and means for comparing the signals after rectification.

11. A plethysmographic method for measuring cardiac output which comprises the steps of: applying a substantially constant current, fluctuating voltage, excitation signal between the upper and lower ends of the thorax of a mammalian subject from above the upper border of the lung to below the lower border of the heart and lung; measuring impedance changes within the portion of the thorax carrying the signal while simultaneously measuring the beginning and the end of systole of the subject; and recording the simultaneous measurements for determining cardiac output therefrom.

12. A plethysmographic method for measuring cardiac output which comprises the steps of: applying a substantially constant current, fluctuating voltage, excitation signal between the upper and lower ends of the thorax of a mammalian subject from above the upper border of the lung to below the lower border of the heart and lung; and measuring impedance changes within the portion of the thorax carrying the signal relative to a period from beginning to end of systole of the subject for determining cardiac output therefrom.

13. A plethysmograph comprising: electrical means adapted to induce a fluctuating excitation current between the superior and inferior ends of the thorax of a mammalian subject; and means for measuring impedance changes in said thorax, in the presence of said fluctuating excitation current, and for measuring, simultaneously, the beginning and the end of systole of the subject.

References Cited
UNITED STATES PATENTS

| | | | |
|---|---|---|---|
| 2,184,511 | 12/1939 | Bagno et al. | 324—56 |
| 3,095,872 | 7/1963 | Tolles | 128—2.05 |
| 3,144,019 | 8/1964 | Haber | 128—2.06 |
| 3,149,627 | 9/1964 | Bagno | 128—2.1 |
| 3,224,435 | 12/1965 | Traite | 128—2.05 |
| 3,267,933 | 8/1966 | Mills et al. | 128—2.06 |
| 3,267,934 | 8/1966 | Thornton | 128—2.06 |
| 3,280,817 | 10/1966 | Jorgenson et al. | 121—2.05 |

RICHARD A. GAUDET, *Primary Examiner.*
SIMON BRODER, *Examiner.*

UNITED STATES PATENT OFFICE
CERTIFICATE OF CORRECTION

Patent No. 3,340,867                      September 12, 1967

William G. Kubicek et al.

It is hereby certified that error appears in the above numbered patent requiring correction and that the said Letters Patent should read as corrected below.

Column 2, lines 4 and 5, for "curren" read -- current --; column 4, line 48, for "$\Delta x$" read -- $\Delta Z$ --; column 6, lines 14 and 22, for "$1M\Omega$", each occurrence, read -- $1MEG\Omega$ --; column 6, line 19, for "$3.9M\Omega$" read -- $3.9MEG\Omega$ --; column 9, line 70, for "plethylsmograph" read -- plethysmograph --; column 10, line 13, for "alapted" read -- adapted --.

Signed and sealed this 24th day of September 1968.

(SEAL)
Attest:

Edward M. Fletcher, Jr.                      EDWARD J. BRENNER

Attesting Officer                             Commissioner of Patents